(12) United States Patent
Arkko

(10) Patent No.: US 6,584,500 B1
(45) Date of Patent: Jun. 24, 2003

(54) DATA ROUTING IN A COMMUNICATION NETWORK

(75) Inventor: Jari Arkko, Kauniainen (FI)

(73) Assignee: Telefonaktiebolaget LM Ericsson, Stockholm (SE)

(*) Notice: Subject to any disclaimer, the term of this patent is extended or adjusted under 35 U.S.C. 154(b) by 0 days.

(21) Appl. No.: 09/446,627
(22) PCT Filed: Jun. 9, 1998
(86) PCT No.: PCT/FI98/00496
§ 371 (c)(1), (2), (4) Date: Mar. 7, 2000
(87) PCT Pub. No.: WO99/00946
PCT Pub. Date: Jan. 7, 1999

(30) Foreign Application Priority Data

Jun. 25, 1997 (FI) .................................................. 972739

(51) Int. Cl.⁷ .......................... H04L 12/14; H04L 12/56
(52) U.S. Cl. ....................... 709/223; 709/225; 709/227; 370/352; 370/392
(58) Field of Search ............................... 709/238, 223, 709/227, 225; 370/352, 392; 705/1

(56) References Cited

U.S. PATENT DOCUMENTS 5,243,592 A * 9/1993 Perlman et al. ............. 370/252
5,600,637 A    2/1997 Kikuta ........................ 370/389
5,754,543 A * 5/1998 Seid ........................... 370/256
5,805,593 A * 9/1998 Busche ....................... 370/238
5,854,899 A * 12/1998 Callon et al. ............... 370/235
6,026,151 A * 2/2000 Bauer et al. .............. 379/114.02
6,175,870 B1 * 1/2001 Gawlick et al. ............. 370/351

FOREIGN PATENT DOCUMENTS

| DE | 195 35 378 A1 | 3/1997 | .......... H04M/15/12 |
| EP | 0 717 535 A2 | 6/1996 | .......... H04L/12/56 |
| WO | WO 96/37848 | 11/1996 | .......... G06F/13/00 |
| WO | WO 97/29584 | 8/1997 | .......... H04M/15/00 |
| WO | WO 98/02828 | 1/1998 | .......... G06F/17/00 |

OTHER PUBLICATIONS

Patent Abstract of Japan, JP 08065394 A, Mar. 8, 1996.

* cited by examiner

*Primary Examiner*—Duug C. Dinh
*Assistant Examiner*—Kevin Parton

(57) ABSTRACT

A method of collecting charging information relating to usage of the Internet by an Internet user. The method comprises constructing in a router of the Internet a routing table containing a set of destination address ranges and a set of respective next hop network nodes. Each address range in the routing table is assigned a cost class in dependence upon the route via which a packet must travel to an address within the range. Upon receiving a data packet from the network user, the destination address of the packet is identified by the router. The router then determines from the routing table the associated cost class. A corresponding cost class counter in the router is then incremented.

7 Claims, 3 Drawing Sheets

DATA ROUTING IN A COMMUNICATION NETWORK

FIELD OF THE INVENTION

The present invention relates to data routing in a communication network. More particularly, though not necessarily, the invention relates to a method and apparatus collecting charging information relating to Internet usage.

BACKGROUND TO THE INVENTION

Typically, Information Service Providers (ISPs) provide their own information and interactive services to subscribers and additionally provide subscribers with a gateway access to the Internet and thereby to thousands of service providers around the world. Subscribers may also access the Internet and the thousands of smaller ISPs directly through smaller local ISPs.

The Internet comprises many communication links and networks interconnected by "routers". ISPs typically lease bandwidth on these links, networks, and routers from operators such as telecommunication operators and therefore need to recoup their outlays and make a profit by passing appropriate charges on to their subscribers.

Generally, large ISPs bill their subscribers on a time-use basis, e.g. on a fee based on connection time, after a financial payment relationship has been established between the subscriber and the ISP. Similarly, smaller local ISPs also usually base their service charges to their subscribers for access to the Internet on a time-use basis. The smaller ISPs either do not charge for access to their information and interactive services or, if they do, also require the user to establish some sort of financial relationship.

Internet users are identified in the Internet by Internet Protocol (IP) addresses which are reserved for the users or service providers. In charging users, the amount of actual packets sent and received is usually not considered, nor is the source of fetched packets. As already mentioned, fixed, time-use based, or packet/byte count based billing mechanisms exist today. Mechanisms for circuit-switched type bandwidth allocation and billing are being designed.

Most circuit switched communication systems, e.g. conventional telephone networks, ATM networks, and so on, are able to perform billing based on distance (local versus long distance call) and on the basis that a connection is reserved and maintained for the duration of a call even though the data comprising the carried communication may pass over the link on an infrequent basis. However, the methods used for circuit switched communication are not directly applicable to packet switched communication used in the Internet, as there are no concepts equivalent to a "circuit" and to "the establishment of a call".

As such, Internet users have the freedom to access any part of the Internet with the same cost regardless of the distance to the accessed part. The cost of an overseas link is of course much higher than the cost of a local link. Consequently the capacity of the overseas link is often very limited. There exists no simple solution today which would allow an ISP or IAP to collect higher fees from those users that use long distance links more than others.

SUMMARY OF THE INVENTION

It is an object of the present invention to generate and record information of the links used by a service provider or the like, in order to provide destination based information regarding the connections that a user has made.

It is another object of the present invention to use link-state routing protocol information to determine whether or not a special-cost link is passed through on a data packet's journey through the Internet.

According to a first aspect of the present invention there is provided a method of collecting charging information relating to usage of a packet-switched data network by a network user, the method comprising:

constructing in a router of the network a routing table containing a set of destination address ranges and a set of respective next hop network nodes;

assigning a cost class to at least one link or node of the data network;

assigning to each address range in the routing table a cost class in dependence upon the links/nodes, and respective cost classes, through which a packet must travel to an address within the range;

receiving a data packet from said network user and identifying its destination address;

on the basis of the destination address, determining from the routing table the associated cost class; and incrementing a corresponding cost class counter.

Preferably, the method comprises classifying destination address ranges into Low and High cost classes. The configuration of these classes may then be based on the simple listing of outgoing links by an Internet Service Provider, instead of enumerating all possible destinations, e.g., on the national level.

Multiple intermediate cost classes may also be defined. Such extensions require the keeping of separate packet/byte counters for each class.

Separate billing for originating and terminating network connections may be made, since the network access node may follow traffic (TCP) to find out which side of the network has initiated the connection. Such control is already used for security purposes in firewalls. Further, UDP (User Datagram Protocol) traffic could be followed (again as in the firewalls) by considering incoming UDP packets to belong to a connection if they originate from an address to which outgoing packets have recently been sent.

Embodiments of the invention have the advantage that information concerning a "destination" which a user has reached can be classified and the classification is relatively short. Billing based on real communication costs to the Service Provider and the user can be performed. In a simplest form, only one memory access to retrieve "High-cost" flags needs to be performed in addition to the normal routing decision. No extra network traffic is created.

The configuration of High and Low cost destinations uses a very simple list of links, instead of enumerating a long and often changing list of destinations.

The solutions can be locally implemented in one Service Provider, without the need for similar techniques in other parts of the Network.

The invention is particularly applicable to the Internet, where a user accesses the open Internet through an Internet Service Provider (ISP). Preferably, the routing table containing the assigned cost classes is provided in a Network Access Server (NAS) of the ISP through which the user accesses a Local Area Network of the ISP.

It will be appreciated that the invention is applicable for collecting charging information relating to any packet switched data service. This includes WWW access, e-mail, Telnet, FTP etc.

Preferably, a "map" of the data network (or a local region of the network, i.e. "autonomous" area) is constructed, using the OSPF protocol, to select the next hop for each group of destination addresses. On the basis of an identified shortest path, a cost class is allocated to the path and hence to the associated destination address range.

According to a second aspect of the present invention there is provided apparatus for collecting charging information relating to usage of a packet-switched data network by a network user, the apparatus comprising:

a router in said network having a memory storing a routing table containing a set of destination address ranges and a set of respective next hop network nodes;

first processing means for assigning a cost class to at least one link or node of the data network; and second processing means associated with said router and arranged to assign to each address range in the routing table a cost class in dependence upon the links/nodes, and respective cost classes, through which a packet must travel to an address within the range, the router being arranged in use to receive a data packet from said network user, to identify its destination address, and on the basis of the destination address to determine from the routing table the associated cost class, the apparatus further comprising a set of counters corresponding to respective cost classes and means for incrementing the cost class counter corresponding to the determined cost class.

BRIEF DESCRIPTION OF THE DRAWINGS for a better understanding of the invention and in order to show how the same may be carried into effect reference will now be made, by way of example, to the accompanying drawings, in which.

DETAILED DESCRIPTION OF CERTAIN EMBODIMENTS

Figure 1:
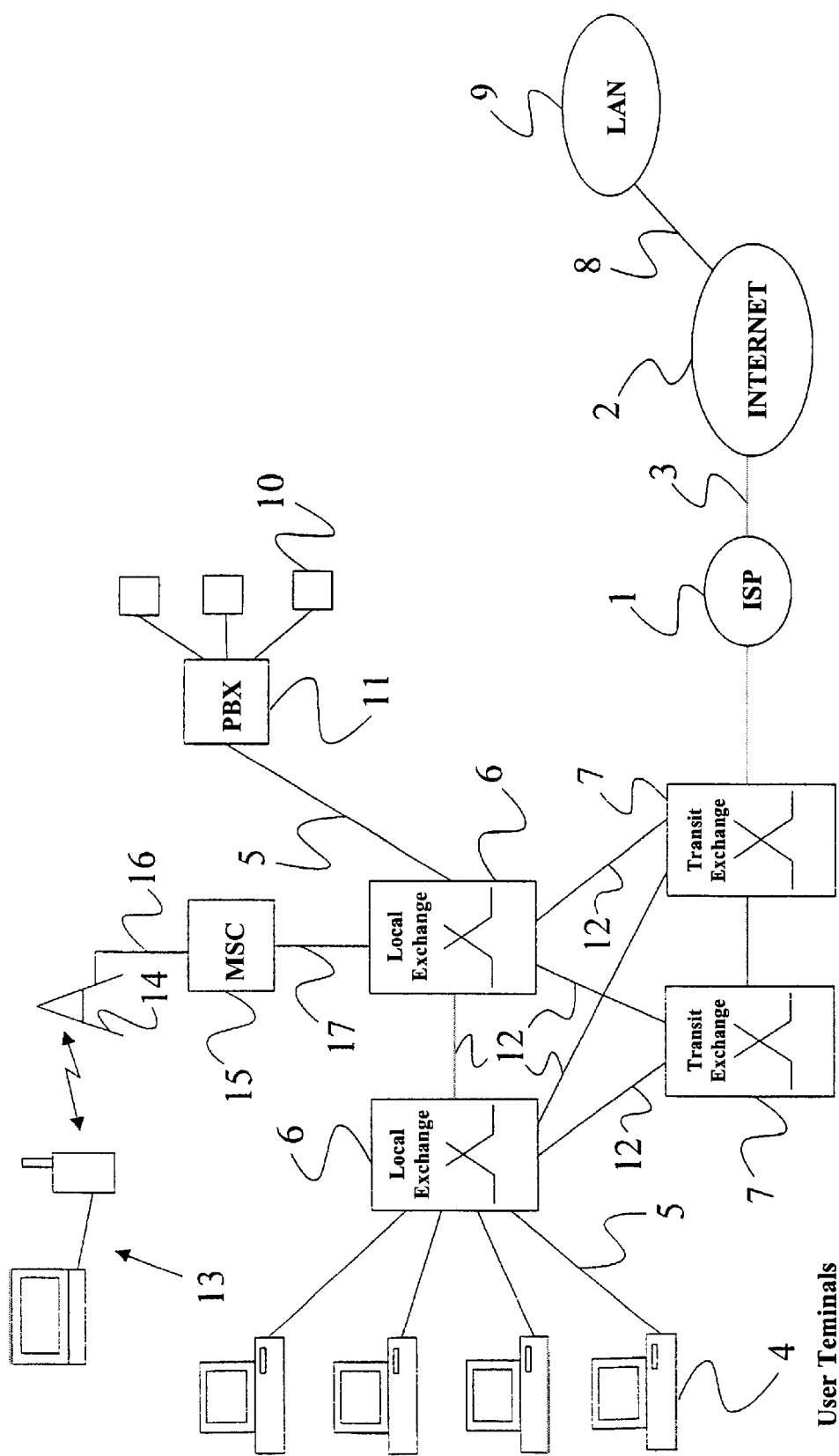
FIG. 1 is a block diagram of a system showing access facilities to the Internet.

In FIG. 1, a single ISP 1 is shown connected on the Internet 2. It should be understood that thousands of ISP's all over the world are connected to the Internet and are arranging accesses to the multitude of users having access to the Internet. Connection between the ISP 1 and the Internet 2 is over a digital Ethernet transmission line 3 or other high speed transmission. A user desiring access to the information and/or interactive services available over the Internet from ISP 1 may be an individual who accesses the Internet through a fixed terminal 4. Terminal 4 is connected to over a POTS (Plain Old Telephone System) connection 5 to the user's Local Exchange (LE) 6 or a Transit Exchange (TE) 7 through a modem (not shown in FIG. 1). The LEs and TEs 6,7 are interconnected by trunk lines 12. From the exchange (s) 6,7 a connection is made to ISP 1.

It will be understood that other Internet users may reach the Internet 2 through a fixed connection 8 from a company Local Area Network (LAN) 9 using ATM or the like. Small companies 10 may also have a limited number of connections to the Internet 2 via call connections through a PBX (Public telephone Exchange) 11. Additionally, subscribers 13 to a digital cellular radio telephone network, comprising base stations 14, mobile switching centre 15, and connections 16,17 may access the Internet through the same ISP 1.

Figure 2:
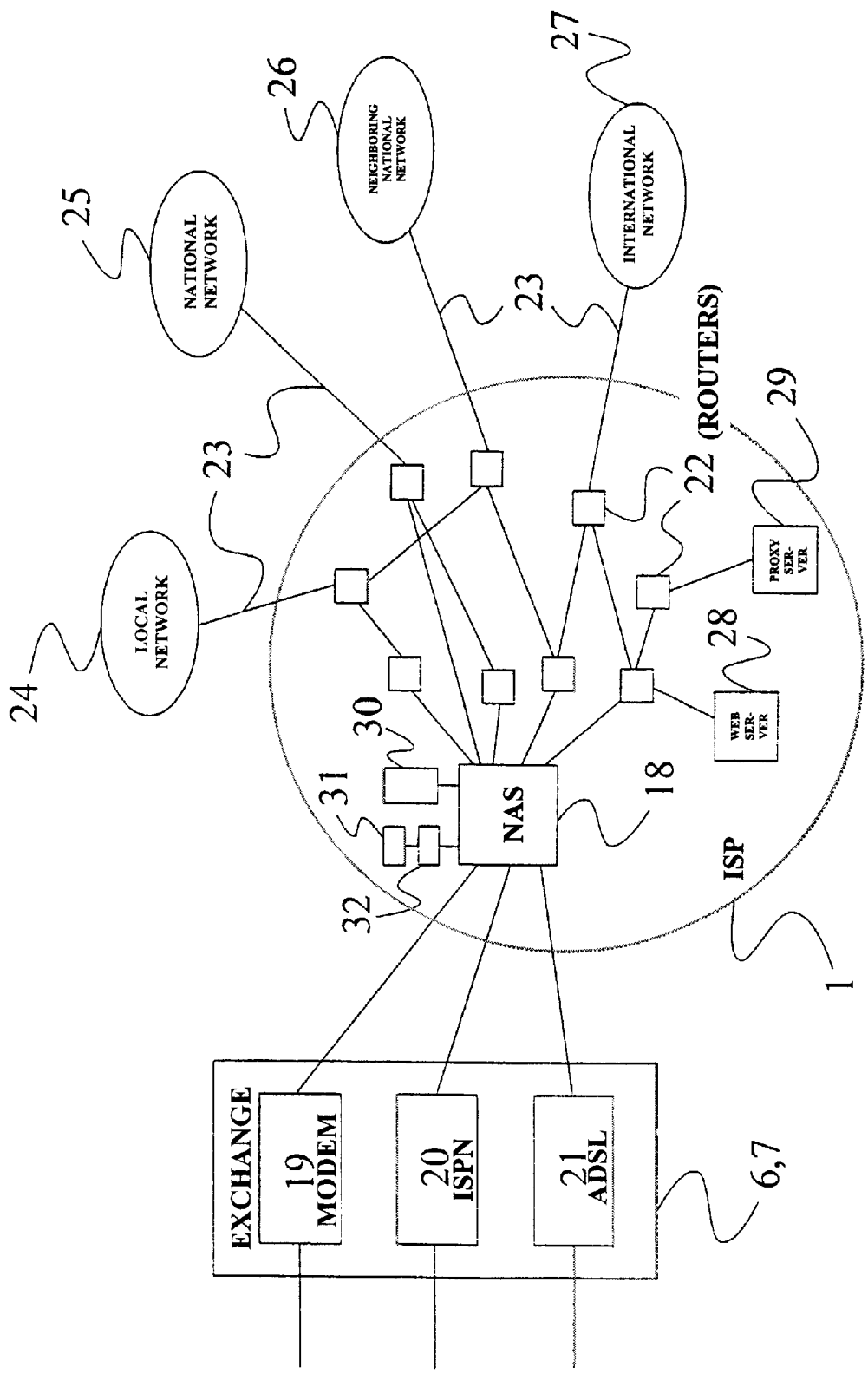
FIG. 2 is a block diagram showing in more detail an Internet Service Provider of the system of FIG. 1.
Figure 3:
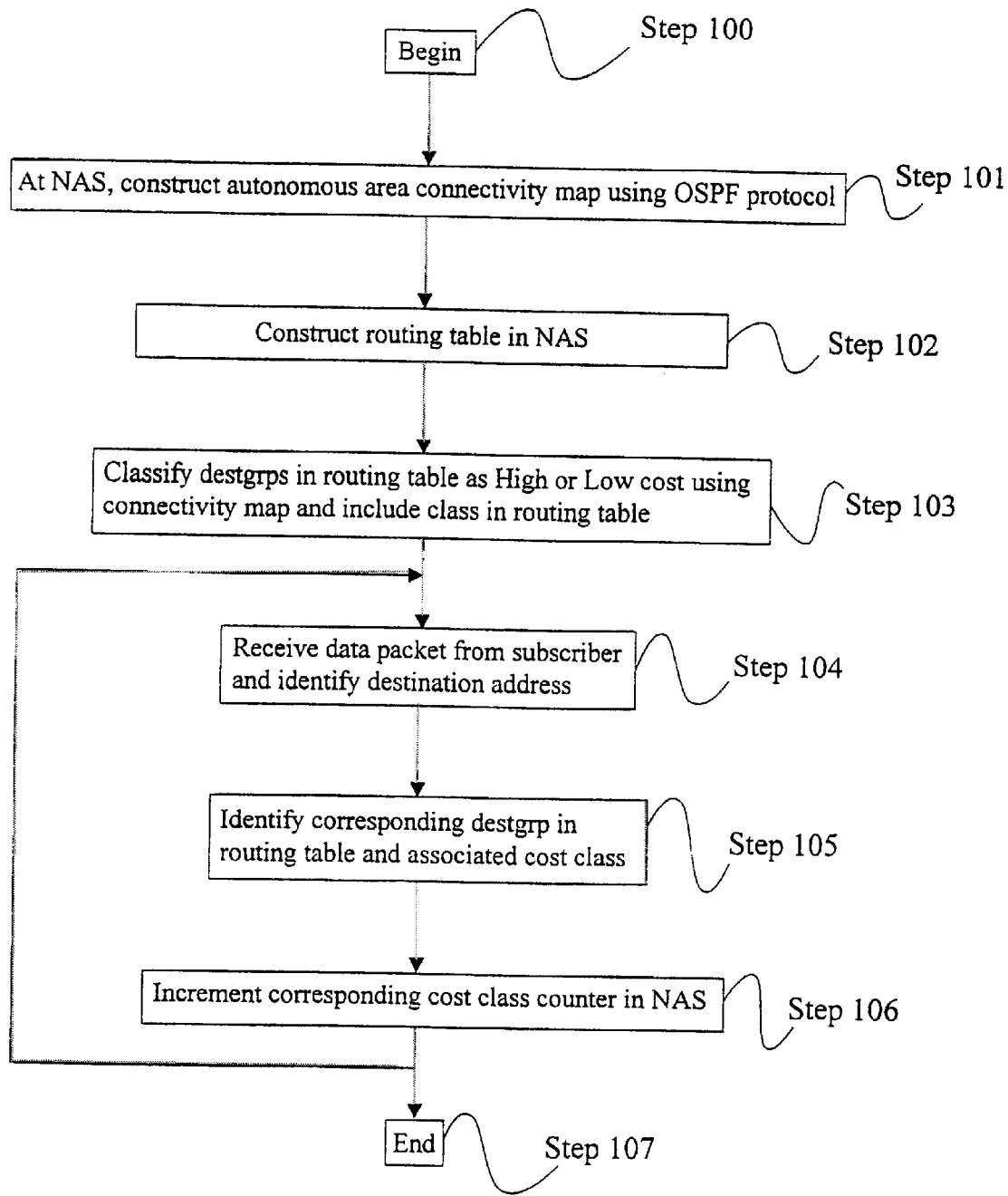
FIG. 3 is a flow diagram of a method of charging in the Internet Service Provider of FIG. 2.

FIG. 2 presents in more detail the ISP 1 of FIG. 1 and its connections to the telecommunications network and to the Internet 2. A subscriber connects to a Network Access Server (NAS) 18 of the ISP 1 via a modem pool 19, ISDN access 20, asymmetric data subscriber line (ADSL) connection 21, or XDSL connection (not shown), of the LE or TE 6,7 (these components may be integrated into the NAS). The NAS 18 interfaces the circuit switched transmission on the telecommunications side to packet switched transmission on the Internet side. Typically a Point-to-Point Protocol (PPP—IETF RFC 1661) connection is established between the subscriber terminal 4 and the NAS 18. The NAS 18 also provides for the initial routing of data packets toward their final destinations.

The ISP 1 typically comprises many additional interconnected routers 22 which may be located near one another or which may be geographically dispersed. These routers convey data packets onwards to links 23 leading from the ISP to external networks. The links may include a local link to a local network 24, a national link to a national network 25, an international link to a neighbouring national network 26, and an intercontinental link to national networks 27 of another continent. The ISP 1 may also be linked to other ISPs (usually employing ATM) although these links are not shown in FIG. 2.

Within the ISP 1, local Web servers 28 may be connected to certain of the NASs/routers in a Local Area Network (LAN). These act as Internet content providers. The ISP 1 also has one or more proxy servers 29 the purpose of which is well known but which will in any case be described below.

A data packet is routed in the ISP 1 and elsewhere in the Internet 2 on the basis of a specified IP address. This address is a 32-bit address assigned to hosts participating in a TCP/IP Internet, and consists of a network portion and host portion. This partition makes for efficient routing. Internet users will be more familiar with Domain Name addresses, e.g. "www.ericsson.co", although these correspond to IP addresses with the conversion being done within the ISP 1.

Every router in the Internet 2, including those routers 22 controlled by the ISP 1 and the NAS 18, are provided with so-called routing tables. A routing table contains a list of IP address groups, together with a list of respective nodes (i.e. routers, hosts, etc) corresponding to a next hop for a data packet. A routing table may have the following form:

| destgrp1 | nxthop1 |
| destgrp2 | nxthop2 |
| destgrp3 | nxthop3 |
| destgrp4 | nxthop4 | where "destgrp#" identifies a range of IP addresses and "nxthop#" identifies a router which is directly connected to the router in which the routing table is stored. When a data packet is received by a router, the routing table is searched, on the basis of the associated IP address, to identify the next router in the chain.

Routing tables are not static, but rather are dynamically modified to reflect changes in the physical and operational structure of the Internet. For a given destgrp, a router uses a protocol termed Open Shortest Path First (OSPF—IETF RFC 1583) to determine the nxthp based upon information received by the router from other connected routers.

Despite the fact that a routing table only contains the next hop for a given IP address range, a router nevertheless requires an internal "map" of the surrounding Internet region to determine that next hop. Considering the ISP 1 of FIG. 2, the map constructed by the NAS 18 may include the ISP network together with the boundary crossing links 23. It will be understood therefore that using this map it is possible to determine the types of links which a data packet, directed to an IP address within a given address range (destgrp#), will or is likely to pass through.

For the purpose of the present example, Internet links are classified into two cost types, High and Low cost. These are defined in a fixed list in a memory of the NAS 18. High cost links are those links which connect the ISP network to foreign networks 26,27 whilst low cost links connect to local and national networks 24,25 and to other ISPs and IAPs. Links within the ISP 1 are also classified as Low cost links. Cost classes are stated in a third column added to the routing table (indicated by reference numeral 30 in FIG. 2) of the NAS 18, and indicate whether or not a data packet routed to an address contained within the destgrp will pass through a High cost link or not. For example:

| destgrp1 | nxthop1 | High |
| destgrp2 | nxthop1 | Low |
| destgrp3 | nxthop3 | Low |
| destgrp4 | nxthop4 | Low |
| destgrp5 | nxthop5 | High |

It will be appreciated that the destgrps may be subdivided, compared to those contained in conventional routing tables, where certain subgroups are associated with High cost links and others are not. For example, destgrp1 and destgrp2 both share the same nxthop, but are classified differently in the cost column of the table.

As has already been described, conventional Internet billing systems provide for charging a subscriber on the basis of time-use and on number of packets sent. The latter is carried out using a packet counter contained in the NAS 18. In order to take advantage of the information contained in column 3 of the modified routing table, a pair of counters are included in the NAS 18. A first of the counters 31 maintains a count of the number of packets forwarded by the NAS 18 through at least one High cost link whilst the other counter 32 maintains a count of other forwarded data packets. It will be appreciated hat the NAS 18 has details of the source of data packets, i.e. subscriber details, and is therefore able to provide billing information to the ISP billing collector (not shown in FIG. 2).

Alternatively, the NAS 18 may send billing information to a billing collector of the telephone network.

The method described above is further illustrated in the flow diagram of FIG. 1 (steps 100 to 107).

Instead of using the OSPF protocol map to determine destgrp cost classes, the NAS 18 may use "dummy" packet transmissions to trace the route through the Internet to a destination. Internet protocols such as ICMP (referred to in IETF—RFC 1393) and employed by programs such as TRACEROUTE may be used for this purpose. However, this implementation creates some additional network traffic every time a user connects to a new server in the Internet, and incurs an additional hashing operation on every packet. Despite its disadvantages, route tracing may be employed where link state routing information is not available. If it is initially not known if a destination address is reached through a High cost link, the trace program can initiate a trace to identify this information.

The provision of a proxy server 29 in the ISP 1 has already been mentioned. The proxy server 29 retains Web pages downloaded by subscribers for some predetermined time. The address of the proxy server 29 is configured in subscribers' Web browsers such that all Web page fetches go first to the proxy server 29. The Server 29 inspects its memory for each request and provides the requested page form its own memory if it is stored there. Otherwise, the proxy server 29 fetches the page from the Internet in the normal manner.

The billing mechanism described above may be expanded to encompass the proxy server 29. In particular, if a Web page requested by a subscriber is not already contained in the memory of the proxy server 29, the fetch request is analysed with the mechanisms presented above, and thus it becomes clear if the request must go through a High cost link or not. The proxy server 29 collects the information and later communicates it to the ISP's billing system.

If it is desired that a subscriber is charged regardless of whether or not the requested page is found in the proxy server 29, the server 29 can add a cost flag to each Web page stored in its memory. The cost of these pages can then be added to a subscriber's bill even though the pages were actually downloaded from the proxy server 29. The cost of retrieving the document from a high cost link may alternatively be recovered by subdividing it between all of the subscribers who download the page from the proxy server 29.

Separate billing for originating and terminating TCP connections could be made. This is possible since the NAS 18 can follow the TCP-level traffic to find out which side has initiated the connection. Such control is already used for security purposes in firewalls. Similarly, UDP traffic could be followed (again as in the firewalls), by considering incoming UDP packets to belong to a connection if they originate from an address to which outgoing packets have recently been sent.

A firewall system can be used to control the access to the global Internet and the user can enable or disable the access through an applet linked with a billing system. The solutions presented here could be combined with such architectures, by allowing multiple levels of accesses: local servers, national access, continental access, international access, and so on. The configuration of these levels would then be based on the listing of outgoing links from the access node, instead of enumerating all possible destinations, e.g. on the national level. With the firewall it is understood that data packets are filtered when arriving at a screening system of the router connected between two networks in order to determine from the packet contents whether or not it is of a type to be passed to the second network.

It is understood to that the ISP network and routers are normally protected by suitable firewalls and source address filters. In the absence of these, Internet users might be able to subvert the routing protocols or ICMP packets. Firewalls within the ISP network should however be able to pass the trace program and routing protocol packets.

It will be appreciated by the person of skill in the art that modifications may be made to the above described embodiments without departing from the scope of the present invention. For example, whilst the modified routing table, containing the cost classifications, has been described as being implemented in the NAS 18 of the ISP 1, it may alternatively, or additionally, be provided in one or more of the routers 22. A modified billing system may then be used to collect charging information from the various distributed counters. In another modification, links may be classified into more than the two classes (High and Low) indicated above. For example, national links may be classified as Medium cost links.

The embodiment described above is concerned with billing subscribers on the basis of outgoing packets. If desired, the NAS 18 (or other router 22) can perform billing on the basis of incoming data packets, based on the source address of the packet. However, this will incur an additional cost roughly equivalent to the routing decision for one packet.

What is claimed is:

1. A method of billing a subscriber to a network service that provides data via a packet-switched data network, the method comprising the steps of:

constructing in a router of the network a routing table containing a set of destination address ranges and a set of respective next hop network nodes;

assigning a cost class to at least one link or node of the data network;

assigning to each address range in the routing table a cost class in dependence upon the links/nodes, and respective cost classes, through which a packet must travel to an address within the range;

receiving a data packet from a terminal coupled to said network and associated with said subscriber and identifying its destination address;

on the basis of the destination address, determining from the routing table the associated cost class;

incrementing a corresponding cost class counter; and billing said subscriber as a function of the value of said cost class counter.

2. The method according to claim 1, wherein the data network is the Internet, and said subscriber accesses the Internet through an Internet Service Provider.

3. The method according to claim 2, wherein the routing table containing the assigned cost classes is provided in a Network Access Server (NAS) of an Internet Service Provider through which said subscriber accesses a Local Area Network of the ISP.

4. The method according to claim 3, wherein the routing table is constructed using OSPF protocol to select the next hop for each group of destination addresses and, on the basis of an identified shortest path, a cost class is allocated to the path and hence to the associated destination address range.

5. An apparatus for billing a subscriber to a network service that provides data via a packet-switched data network, said apparatus comprising:

a router in said network having a memory storing routing table containing a set of destination address ranges and a set of respective next hop network nodes;

first processing means for assigning a cost class to at least one link or node of the data network; and second processing means accocciated with said router and arranged to assign to each address range in the routing table a cost class in dependence upon the link/nodes, and respective cost classes, through which a packet must travel to an address within the range, the router being operable to i) receive a data packet from a terminal coupled to said network and associated with said subscriber, ii) to identify the destination address of said data packet, and, on the basis of the destination address to determine from the routing table the associated cost class, the apparatus further comprising a set of counters corresponding to respective cost classes and means for incrementing the cost class counter corresponding to the determined cost class; and means for billing said subscriber as a function of the value of said cost class counter.

6. A method for billing a subscriber to a network service that provides information via a packet-switched data network, said method comprising the steps of:

initiating a connection to a data network;

connecting the subscriber's computer to the data network;

communicating with host servers via the data network;

creating destination information associated with said host servers;

classifying the destination information to different types;

comparing the addresses of the host servers with the type information;

combining the type information with subscriber information; and billing said subscriber as a function of said type and subscriber information.

7. A system for billing a subscriber to a network service that provides data via a packet-switched data network, said system comprising:

means for receiving a connection request to a service provider's network access server by a subscriber's computer;

means for establishing a connection from the subscriber's computer to the service provider's router in order to access the packet-switched data network;

means for allowing the subscriber's computer to communicate with host servers via the packet-switched data network;

means for obtaining destination information associated with said host servers;

means for classifying the destination information to different types, means for comparing the addresses of said host servers with the type information;

means for combining the type information with subscriber information; and, means for billing said subscriber as a function of said type and subscriber information.

* * * * *